Feb. 25, 1930.                R. P. DUNMIRE                1,748,544
                              CONDUIT FITTING
                            Filed Oct. 30, 1925

INVENTOR.
Russell P. Dunmire
BY
ATTORNEYS.

Patented Feb. 25, 1930

1,748,544

UNITED STATES PATENT OFFICE

RUSSELL P. DUNMIRE, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed October 30, 1925. Serial No. 65,821.

This invention is designed to improve conduit fittings for use with threadless conduits and is directed to the improvement of means for securing the conduit to the fitting. Features and details of the invention will appear from the specification and claim.

The invention is illustrated in the accompanying drawings as follows:—

Figure 1:
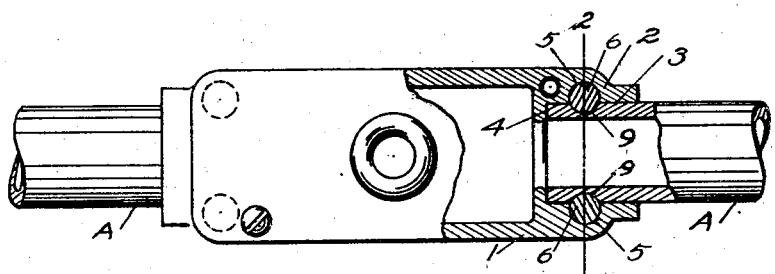
Figure 2:
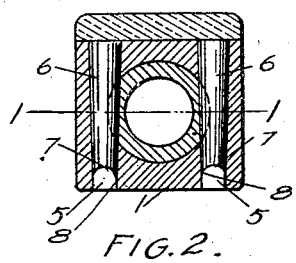

Fig. 1 shows a plan view of the fitting on the line 1—1 in Fig. 2.

Fig. 2 a section on the line 2—2 in Fig. 1.

Figure 3:
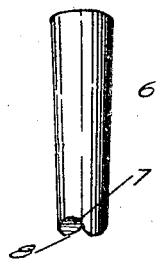

Fig. 3 an enlarged view of one of the key pins.

1 marks the body of the fitting which as exemplified is in the form of a conduit box. The conduit box is provided with a conduit extension 2 having a conduit opening 3 adapted to receive a conduit A. The usual guard shoulder 4 is arranged at the inner end of the opening 3.

Transverse openings 5 are arranged in the extension 2. These are off-set from the opening 3 but extend into it. Key pins 6 are placed in the openings 5. These are provided with grooves 7 at their ends forming cutting edges 8.

In order to lock a conduit with the fitting the conduit is inserted in the opening 3 and the pins 6 driven into the opening, the cutting edge 8 cutting a groove in the wall of the conduit and forming a key seat 9 for the pin. The pin and opening are preferably slightly tapered so that when the pin is in its final position it not only has cut the key seat in the wall of the conduit but the conduit is also clamped by the wedging action of the pin.

It will be noted that the cover closes the openings 5 and thus locks the tapered keys in place.

What I claim as new is:—

In a conduit box, the combination of a body having a conduit opening and an extension with a transverse opening off-set from and extending into the conduit opening; a tapered locking pin in the transverse opening adapted to engage an inserted conduit; and a cover closing the transverse opening and locking the pin in place.

In testimony whereof I have hereunto set my hand.

RUSSELL P. DUNMIRE.